United States Patent
Ishihara

(10) Patent No.: US 9,565,321 B2
(45) Date of Patent: Feb. 7, 2017

(54) INFORMATION PROCESSING APPARATUS AND METHOD FOR DETERMINING FAX DESTINATION INFORMATION

(71) Applicant: CANON KABUSHIKI KAISHA, Tokyo (JP)

(72) Inventor: Tomohiro Ishihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/679,867

(22) Filed: Apr. 6, 2015

(65) Prior Publication Data

US 2015/0288831 A1 Oct. 8, 2015

(30) Foreign Application Priority Data

Apr. 8, 2014 (JP) .................................. 2014-079520

(51) Int. Cl.
*H04N 1/00* (2006.01)
*H04N 1/32* (2006.01)

(52) U.S. Cl.
CPC ............ *H04N 1/0022* (2013.01); *H04N 1/001* (2013.01); *H04N 1/32037* (2013.01)

(58) Field of Classification Search
CPC ............ H04N 1/32133; H04N 1/32101; H04N 1/00209
USPC ................ 358/1.15, 1.13, 405, 407
See application file for complete search history.

(56) References Cited

U.S. PATENT DOCUMENTS

2002/0051175 A1* 5/2002 Nagao ................ H04N 1/00209
358/1.15
2013/0051541 A1* 2/2013 Inoue ................... H04M 11/066
379/100.01

FOREIGN PATENT DOCUMENTS

JP 2004-112515 A 4/2004

* cited by examiner

*Primary Examiner* — Jamares Q Washington
(74) *Attorney, Agent, or Firm* — Canon USA, Inc. I.P. Division

(57) ABSTRACT

The invention provides an information processing apparatus capable of preliminarily determining a connection number for each communication mode and easily allocating a suitable connection number to a communication mode designated by a user. A method for controlling the information processing apparatus includes receiving a destination number from a user, determining a communication mode for each received destination number, controlling an information processing apparatus in such a way as to use the destination number and a first connection number as a destination if the determined communication mode is a FAX mode, and controlling the information processing apparatus in such a way as to use the destination number and a second connection number as a destination, which is different from the first connection number, if the determined communication mode is an IP-FAX mode.

9 Claims, 21 Drawing Sheets

FIG.4

- 500
- 510 FAX: fax 00100
- PRESET: DEFAULT SETTINGS
- NUMBER OF COPIES: 1 — 520
- PAGE: ● ALL ○ START: 1 — 530 END: 1 — 540
- PAPER SIZE: A4 210 × 297 mm — 550
- ORIENTATION: 
- BASIC SETTINGS — 560
- 570
- DESTINATION LIST: DESTINATION NAME | FAX NUMBER/URI | COMMUNICATION MODE
- 580 ADDITION OF DESTINATION...
- 590 ADDRESS BOOK...
- 600 EDITING OF DESTINATION...
- 610 DELETION
- NUMBER OF DESTINATIONS: 0
- ○ DESIGNATE TRANSMISSION TIME:
- SET...
- PDF ▼  CONCEAL DETAILS
- 620 CANCEL
- 630 TRANSMIT
- 1/1

FIG.5

| ADDITION OF DESTINATION | |
|---|---|
| DESTINATION NAME: | [          ] —810 |
| COMMUNICATION MODE: | [G3/G4 ⇅] —820 |
| FAX NUMBER/URI: | [FAX NUMBER ⇅] —830 |
| FAX NUMBER: | [          ] —840 |

SPECIAL FUNCTION:
☐ USE F CODE
F CODE: [          ]
PASSWORD: [          ]

[CANCEL]  [OK]
  850      860

FIG.6

PRINTER: fax 00100
PRESET: DEFAULT SETTINGS
NUMBER OF COPIES: 1
PAGE: ● ALL
○ START: 1  END: 1
PAPER SIZE: A4  210 × 297 mm
ORIENTATION:

BASIC SETTINGS

DESTINATION LIST:

| DESTINATION NAME | FAX NUMBER/URI | COMMUNICATION MODE |
|---|---|---|
| A | 0312345678 | G3/G4 |
| B | 5350 | Intranet |
| C | 1112222 | VoIP Gateway |
| D | abc@xyz.co.jp | Intranet |

910
920
930

ADDITION OF DESTINATION...
ADDRESS BOOK...
EDITING OF DESTINATION... — 940
DELETION

NUMBER OF DESTINATIONS: 3
☐ DESIGNATE TRANSMISSION TIME:

SET... — 950
CANCEL  TRANSMIT — 960

1/1

PDF ▼  CONCEAL DETAILS

FIG.7

PRINTER: fax 00100
PRESET: DEFAULT SETTINGS
NUMBER OF COPIES: 1
PAGE: ● ALL  ○ START: 1  END: 1
PAPER SIZE: A4  210 × 297 mm
ORIENTATION:
SPECIAL PROCESSING RESOLUTION: FINE — 1020
1010 — ○ OUTSIDE LINE CONNECTION NUMBER (G3/G4/IP-FAX)  SET... — 1030

LINE SELECTION: AUTOMATIC
CHANGE OF LINE NAME...  SET...

TRANSMISSION SOURCE: xxxx-yyyy
○ REENTER FAX NUMBER/URI BEFORE ADDING SET NUMBER TO "DESTINATION LIST"

CANCEL   TRANSMIT

PDF ▾   CONCEAL DETAILS
1/1

FIG.8

SETTING OF OUTSIDE LINE CONNECTION NUMBER

G3/G4: 1110 ~ [ 0 ]

Intranet: 1120 ~ [ ]

NGN: 1130 ~ [ ]

VoIP Gateway: 1140 ~ [ ]

1160 ~ [ CANCEL ] [ OK ] ~ 1170

RESOLUTION: [ FINE ]

☑ OUTSIDE LINE CONNECTION NUMBER (G3/G4/IP-FAX)

0    [ SET... ]

LINE SELECTION: [ AUTOMATIC ]

[ CHANGE OF LINE NAME... ]

TRANSMISSION SOURCE: xxxx-yyyy  [ SET... ]

☐ REENTER FAX NUMBER/URI BEFORE ADDING SET NUMBER TO "DESTINATION LIST"

[ CANCEL ] [ TRANSMIT ]

FIG.9A

|   | DESTINATION NAME | DESTINATION NUMBER | COMMUNICATION MODE | FAX NUMBER/ URI |
|---|---|---|---|---|
| 1 | A | 0312345678 | G3/G4 | FAX NUMBER |
| 2 | B | 5350 | Intranet | FAX NUMBER |
| 3 | C | 11112222 | VoIP Gateway | FAX NUMBER |
| 4 | D | abc@xyz.co.jp | Intranet | URI |

FIG.9B

| COMMUNICATION MODE | OUTSIDE LINE CONNECTION NUMBER |
|---|---|
| G3/G4 | 0 |
| Intranet | 602 |
| NGN | 00 |
| VoIP Gateway | 050 |

FIG.9C

|   | DESTINATION NAME | DESTINATION NUMBER | COMMUNICATION MODE | FAX NUMBER/ URI |
|---|---|---|---|---|
| 1 | A | 00312345678 | G3/G4 | FAX NUMBER |
| 2 | B | 6025350 | Intranet | FAX NUMBER |
| 3 | C | 05011112222 | VoIP Gateway | FAX NUMBER |
| 4 | D | abc@xyz.co.jp | Intranet | URI |

FIG.13

PRINTER: fax 00100

SETTING OF OUTSIDE LINE CONNECTION NUMBER

* SET OUTSIDE LINE CONNECTION NUMBER

*1410*

0

CANCEL    OK

SPECIAL PROCESSING

RESOLUTION:    FINE

☑ OUTSIDE LINE CONNECTION NUMBER (G3/G4/IP-FAX)

0    SET...

LINE SELECTION:    AUTOMATIC

CHANGE OF LINE NAME...

TRANSMISSION SOURCE: xxxx-yyyy    SET...

☐ REENTER FAX NUMBER/URI BEFORE ADDING SET NUMBER TO "DESTINATION LIST"

CANCEL    TRANSMIT

FIG.14A

| | DESTINATION NAME | DESTINATION NUMBER | COMMUNICATION MODE | FAX NUMBER/URI |
|---|---|---|---|---|
| 1 | A | 0312345678 | G3/G4 | FAX NUMBER |
| 2 | B | 5350 | Intranet | FAX NUMBER |
| 3 | C | 11112222 | VoIP Gateway | FAX NUMBER |
| 4 | D | abc@xyz.co.jp | Intranet | URI |

FIG.14B

| OUTSIDE LINE CONNECTION NUMBER |
|---|
| 0 |

FIG.14C

| | DESTINATION NAME | DESTINATION NUMBER | COMMUNICATION MODE | FAX NUMBER/URI |
|---|---|---|---|---|
| 1 | A | 00312345678 | G3/G4 | FAX NUMBER |
| 2 | B | 5350 | Intranet | FAX NUMBER |
| 3 | C | 11112222 | VoIP Gateway | FAX NUMBER |
| 4 | D | abc@xyz.co.jp | Intranet | URI |

FIG.16A

|   | DESTINATION NAME | DESTINATION NUMBER | COMMUNICATION MODE | FAX NUMBER/ URI |
|---|---|---|---|---|
| 1 | A | 0312345678 | G3/G4 | FAX NUMBER |
| 2 | B | 6025350 | Intranet | FAX NUMBER |
| 3 | C | 11112222 | VoIP Gateway | FAX NUMBER |
| 4 | D | abc@xyz.co.jp | Intranet | URI |

FIG.16B

| COMMUNICATION MODE | OUTSIDE LINE CONNECTION NUMBER |
|---|---|
| G3/G4 | 0 |
| Intranet | 602 |
| NGN | 00 |
| VoIP Gateway | 050 |

FIG.16C

| DESTINATION NAME | DESTINATION NUMBER | COMMUNICATION MODE | FAX NUMBER/ URI |
|---|---|---|---|
| A | 00312345678 | G3/G4 | FAX NUMBER |
| B | 6025350 | Intranet | FAX NUMBER |
| C | 05011112222 | VoIP Gateway | FAX NUMBER |
| D | abc@xyz.co.jp | Intranet | URI |

FIG.18A

| DESTINATION NAME | DESTINATION NUMBER | COMMUNICATION MODE | FAX NUMBER/ URI |
|---|---|---|---|
| A | 0312345678 | G3/G4 | FAX NUMBER |
| B | 6025350 | Intranet | FAX NUMBER |
| C | 11112222 | VoIP Gateway | FAX NUMBER |
| D | abc@xyz.co.jp | Intranet | URI |

FIG.18B

| COMMUNICATION MODE | OUTSIDE LINE CONNECTION NUMBER |
|---|---|
| G3/G4 | 0 |
| Intranet | 602 |
| NGN | 00 |
| VoIP Gateway | 050 |

FIG.18C

| COMMUNICATION MODE | OUTSIDE LINE CONNECTION NUMBER |
|---|---|
| G3/G4 | 0 |
| Intranet | |
| NGN | |
| VoIP Gateway | 050 |

FIG.18D

| DESTINATION NAME | DESTINATION NUMBER | COMMUNICATION MODE | FAX NUMBER/ URI |
|---|---|---|---|
| A | 0312345678 | G3/G4 | FAX NUMBER |
| B | 6025350 | Intranet | FAX NUMBER |
| C | 11112222 | VoIP Gateway | FAX NUMBER |
| D | abc@xyz.co.jp | Intranet | URI |

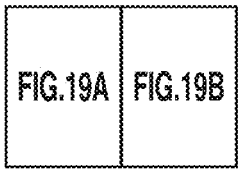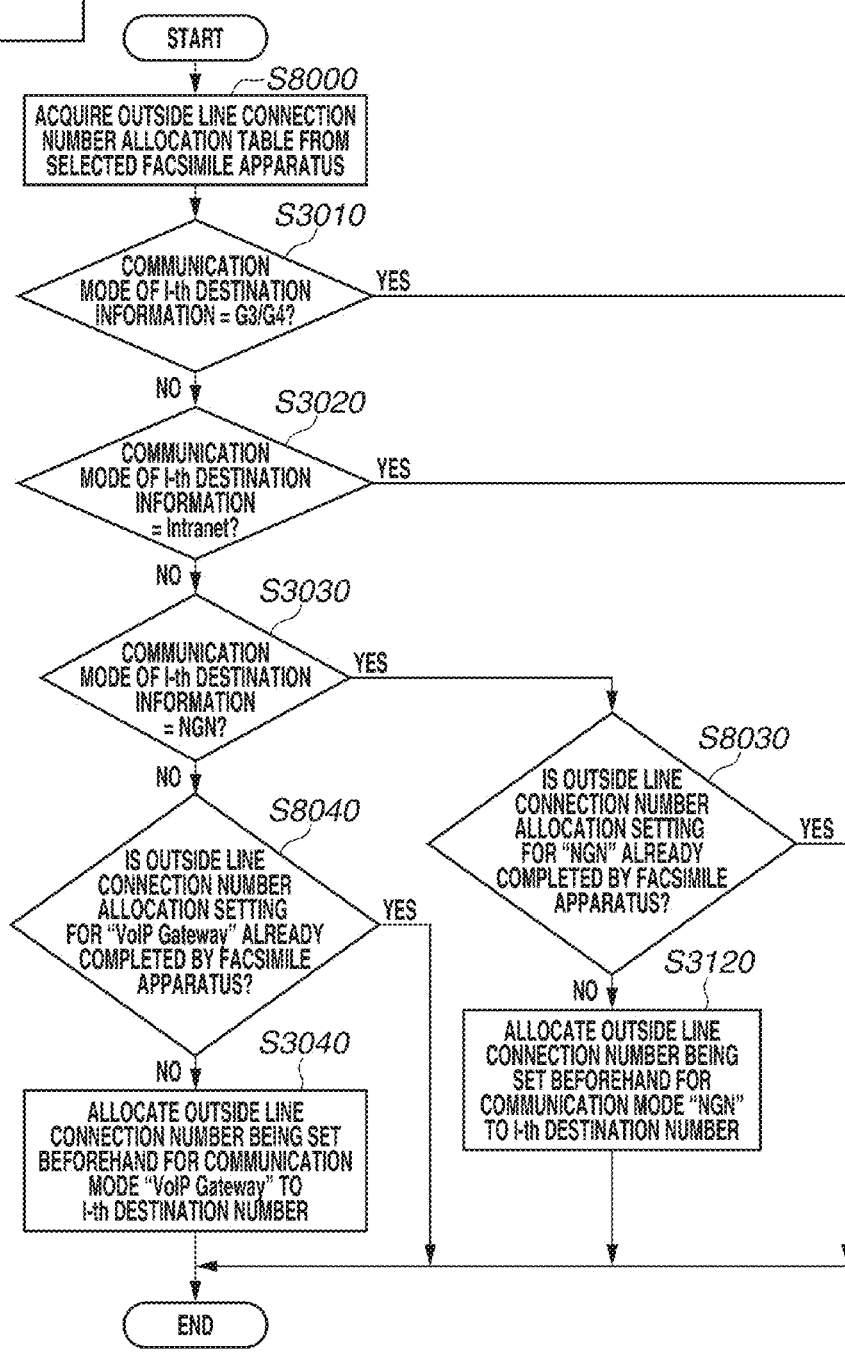

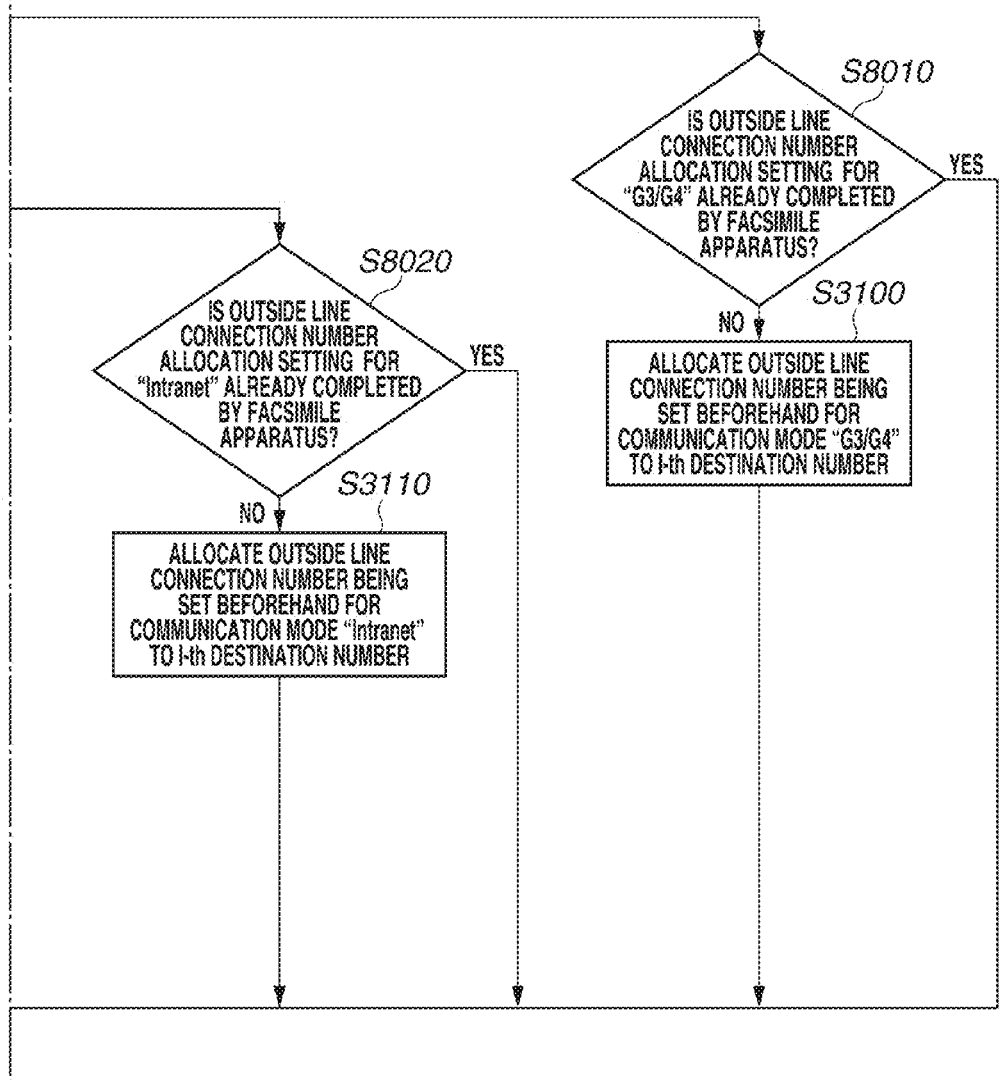

INFORMATION PROCESSING APPARATUS AND METHOD FOR DETERMINING FAX DESTINATION INFORMATION

BACKGROUND OF THE INVENTION

Field of the Invention

The present invention relates to an information processing apparatus, a method for controlling the information processing apparatus, and a storage medium.

Description of the Related Art

It is conventionally known that a personal computer (PC) on which a FAX driver (software) is installed can transmit image data to an image processing apparatus (e.g., a facsimile machine). The image processing apparatus can transmit a FAX document based on the received image data.

Further, as discussed in Japanese Patent Application Laid-Open No. 2004-112515, there is a conventional image processing apparatus that can transmit a FAX document to an external company or building when an outside line connection number added to the head of a destination telephone number is received from a user. In this case, the image processing apparatus selects a communication mode, such as FAX (G3) or IP-FAX, in accordance with a head number including the outside line connection number entered by the user.

Further, there is a conventional FAX driver that stores outside line connection numbers beforehand so that the procedure for allocating each outside line connection number can be simplified and can allocate a desired outside line connection number to a transmission destination designated by a user in response to a pressing of an outside line connection number calling button.

According to the above-mentioned conventional technique, a fixed outside line connection number is uniformly allocated regardless of communication mode (e.g., IP-FAX or G3). Therefore, the following problems occur.

In general, when the communication mode is IP-FAX, no outside line connection number is required or an outside line connection number dedicated to the IP-FAX environment (which is different from the connection number dedicated to the G3 environment) is required. Therefore, if the above-mentioned function is used in the IP-FAX environment, an error or wrong transmission may occur because an unnecessary outside line connection number is added to the destination.

SUMMARY OF THE INVENTION

According to an aspect of the present invention, an information processing apparatus includes a receiving unit configured to receive a destination number from a user, a determination unit configured to determine a communication mode for performing communications based on the destination number received by the receiving unit, and a control unit configured to control the information processing apparatus in such a way as to use the destination number and a first connection number as a destination if the communication mode determined by the determination unit is a FAX mode, and configured to control the information processing apparatus in such a way as to use the destination number and a second connection number, which is different from the first connection number, as a destination if the communication mode determined by the determination unit is an IP-FAX mode.

Further features of the present invention will become apparent from the following description of exemplary embodiments with reference to the attached drawings.

BRIEF DESCRIPTION OF THE DRAWINGS

FIG. 4 illustrates a FAX driver screen according to the first exemplary embodiment.

FIG. 5 illustrates a FAX driver screen according to the first exemplary embodiment.

FIG. 6 illustrates a FAX driver screen according to the first exemplary embodiment.

FIG. 7 illustrates a FAX driver screen according to the first exemplary embodiment.

FIG. 8 illustrates a FAX driver screen according to the first exemplary embodiment.

FIGS. 9A, 9B, and 9C illustrate destination information tables according to the first exemplary embodiment.

FIG. 13 illustrates a FAX driver screen according to a second exemplary embodiment.

FIGS. 14A, 14B, and 14C illustrate destination information tables according to the second exemplary embodiment.

FIGS. 16A, 16B, and 16C illustrate destination information tables according to a third exemplary embodiment.

FIGS. 18A, 18B, 18C, and 18D illustrate destination information tables according to a fourth exemplary embodiment.

FIG. 19 (19A and 19B) is a flowchart illustrating control processing that can be performed by the client apparatus according to the fourth exemplary embodiment.

DESCRIPTION OF THE EMBODIMENTS

Figure 1:
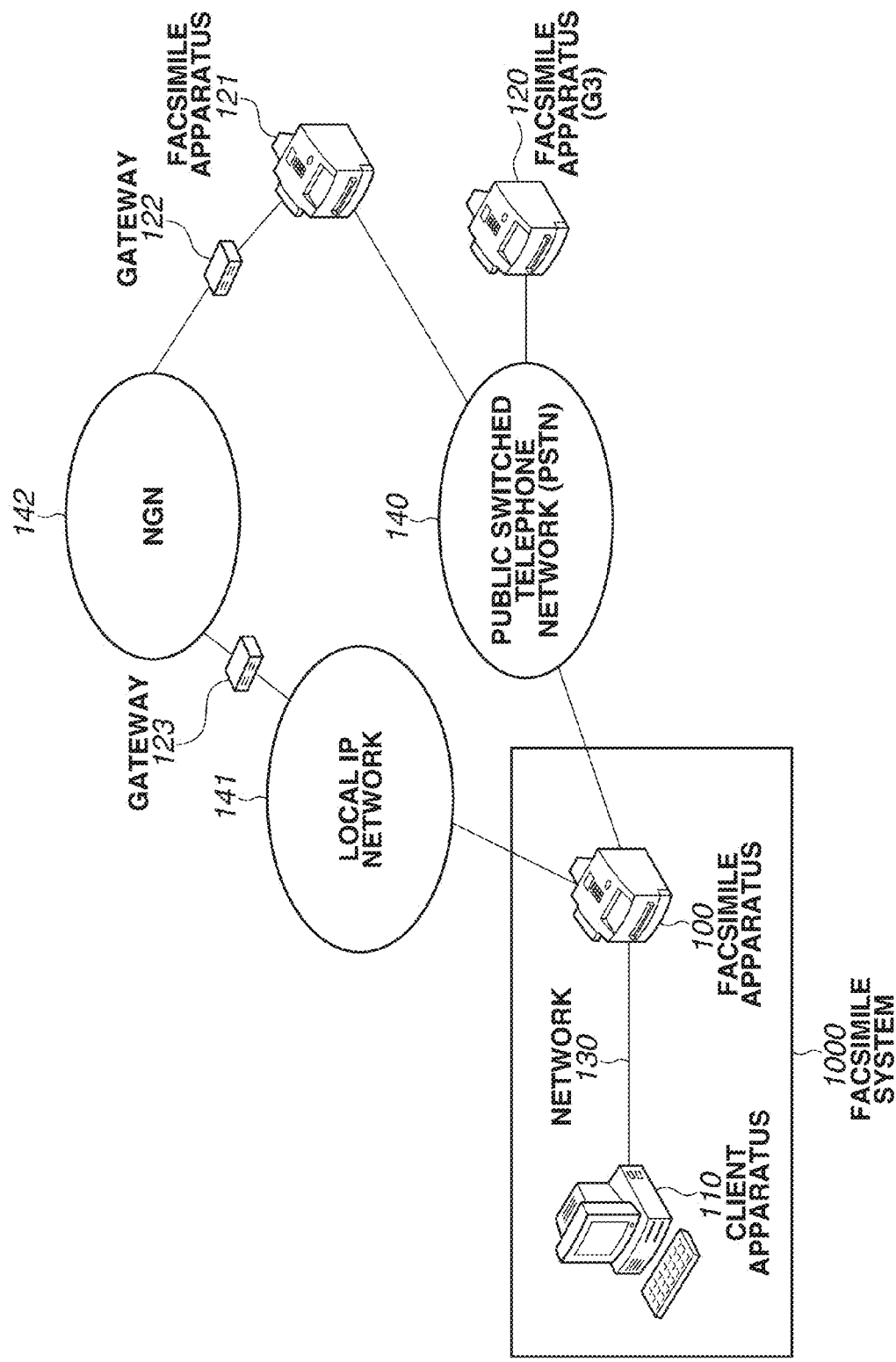
FIG. 1 illustrates a configuration of a network system according to a first exemplary embodiment.

Hereinafter, exemplary embodiments of the present invention will be described in detail below with reference to attached drawings.

An example of a network system according to a first exemplary embodiment will be described in detail below.

A facsimile system 1000 includes a facsimile apparatus 100 (i.e., an example of an image processing apparatus) and a client apparatus 110 (i.e., an example of an information processing apparatus).

The facsimile apparatus 100 and the client apparatus 110 are connected via a network 130. Further, the facsimile apparatus 100 is connected to a public switched telephone network (PSTN) 140 and a local IP network 141.

A facsimile apparatus (G3) 120 is connected to the PSTN 140. Further, a facsimile apparatus 121 is connected to the PSTN 140 and is also connected to a next generation network (NGN) 142 via a gateway 122.

In the above-mentioned connection environment, the facsimile apparatus 100 can communicate with the facsimile apparatus (G3) 120 via the PSTN 140. Further, the facsimile apparatus 100 can communicate with the facsimile apparatus 121 via the local IP network 141, a gateway 123, the NGN 142, and the gateway 122.

The client apparatus 110 is, for example, a personal computer (PC) that includes a FAX driver capable of controlling the facsimile apparatus 100. The client apparatus 110 can generate image data using application software installed thereon and can transmit the generated image data to the facsimile apparatus 100 via the FAX driver.

If image data is received from the client apparatus 110, the facsimile apparatus 100 can transmit the received image data to a facsimile apparatus that has been preliminarily designated as a destination. Each of the facsimile apparatus 120 and the facsimile apparatus 121 is a destination facsimile apparatus having been preliminarily designated. However, the preliminarily designated destination facsimile apparatus is not limited to the above-mentioned examples and may be any facsimile apparatus connected to the local IP network 141.

Further, in response to an original document transmission instruction received from a user via an operation unit of the facsimile apparatus 100, the facsimile apparatus 100 can read an original document and transmit an image of the read original document to a destination facsimile apparatus.

Further, the facsimile apparatus 100 has a facsimile receiving function of receiving image data from the facsimile apparatus 120 and the facsimile apparatus 121, and can print an image on a sheet based on the received image data.

The client apparatus 110 is not limited to the above-mentioned PC and can be a personal digital assistant (PDA), a smartphone, or any other portable information terminal. Further, the facsimile apparatus 100 may be a multi functional peripheral (MFP) having a copy function and a PC print function.

Next, a configuration of the facsimile apparatus 100 will be described in detail below with reference to FIG. 2.

Figure 2:
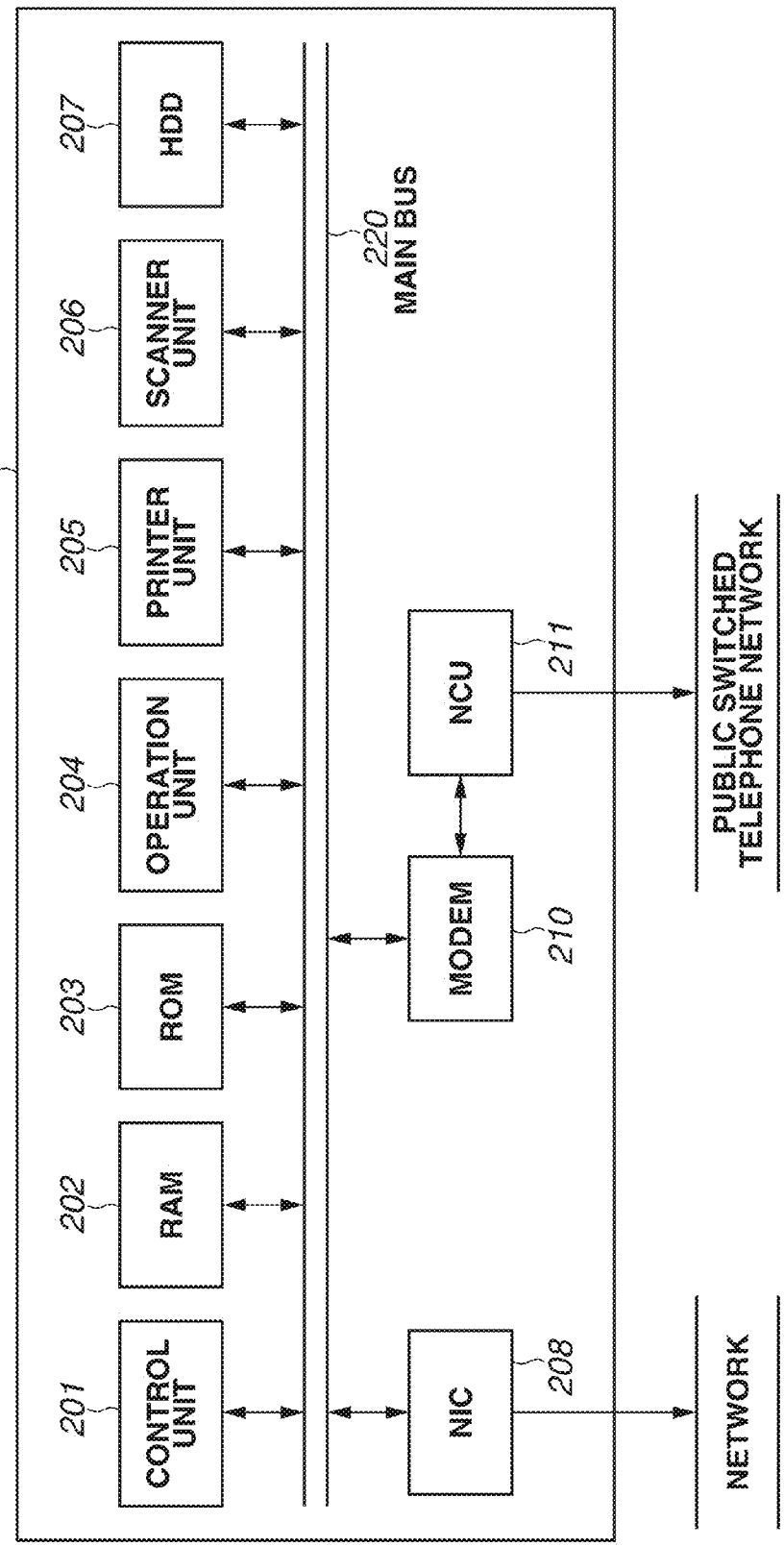
FIG. 2 illustrates a configuration of a facsimile apparatus according to the first exemplary embodiment.

FIG. 2 is a block diagram illustrating a hardware configuration of the facsimile apparatus 100 illustrated in FIG. 1.

In FIG. 2, a control unit 201 can read programs from a read only memory (ROM) 203 and can execute each program loaded in a random access memory (RAM) 202 to control various operations to be performed by the facsimile apparatus 100.

The RAM 202 is a volatile memory that is functionally operable as a work area of the control unit 201.

The ROM 203 is a nonvolatile memory that stores various programs that can be read and executed by the control unit 201.

An operation unit 204 is constituted by hard keys and a display unit equipped with a touch panel. Operation screens and operational states of the facsimile apparatus 100 are displayed on the display unit. The operation unit 204 can accept user instructions entered via hard keys and the touch panel.

A printer unit 205 can print an image on a recording medium (e.g., a sheet) conveyed from a paper feeding cassette or a manual bypass tray based on an instruction from the control unit 201.

A scanner unit 206 can read an original document set on an auto document feeder (ADF) or on a platen glass and can convert a read document image into image data according to an instruction from the control unit 201.

A hard disk drive (HDD) 207 is a nonvolatile storage device capable of storing various programs and image data.

A network interface card (NIC) 208 can perform an interface control for causing the facsimile apparatus 100 to transmit and receive data via the network.

A modem 210 can modulate and demodulate image data when a data transmission/reception operation is performed.

A network control unit (NCU) 211 can connect the facsimile apparatus 100 to the PSTN 140 and can control opening/closing of a communication line, calling/answering, and transmission/reception of image data.

The above-mentioned constituent components, except for the NCU 211, are mutually connected via a main bus 220 and can transmit and receive data via the main bus 220.

Next, a configuration of the client apparatus 110 will be described in detail below with reference to FIG. 3.

Figure 3:
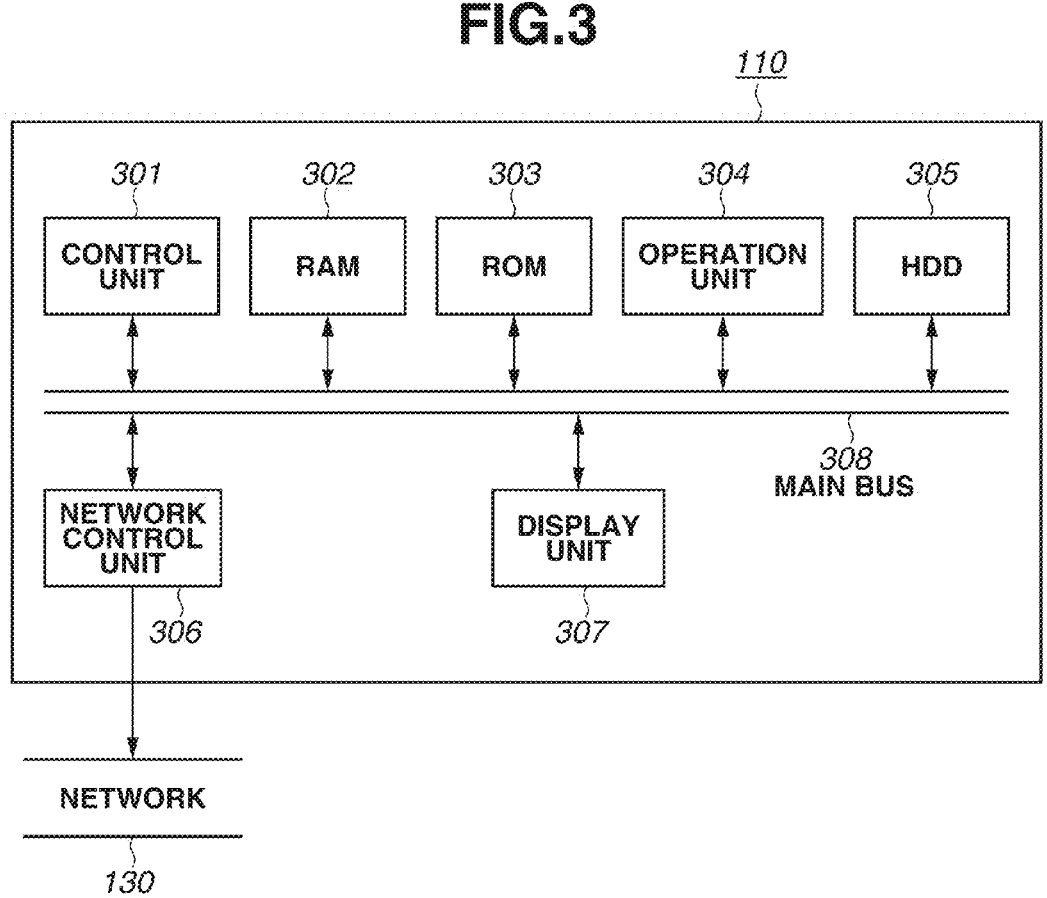
FIG. 3 illustrates a client apparatus according to the first exemplary embodiment.

FIG. 3 is a block diagram illustrating a hardware configuration of the client apparatus 110 illustrated in FIG. 1.

A control unit 301 can read programs from a ROM 303 and can execute each program loaded in a RAM 302 to control various operations to be performed by the client apparatus 110.

The RAM 302 is a volatile memory that can be used as a work area of the control unit 301.

The ROM 303 is a nonvolatile memory capable of storing various programs read by the control unit 301.

An operation unit 304 is constituted by hard keys and a mouse, which can be used to accept user instructions. The operation unit 304 may be configured to include a touch panel.

An HDD 305 is a nonvolatile storage device capable of storing various programs and image data.

A network control unit 306 can perform a network control to cause the client apparatus 110 to communicate with an external apparatus (e.g., the facsimile apparatus 100) via the network 130.

A display unit 307 is constituted by a liquid crystal display device, which can display various screens relating to applications to be executed by the client apparatus 110 in addition to FAX driver screens.

The above-mentioned constituent components are mutually connected via a main bus 308 and can transmit and receive data via the main bus 308.

Next, a FAX driver screen displayed on the display unit 307 of the client apparatus 110 will be described in detail below with reference to FIG. 4. For example, the FAX driver screen is called and started up by application software (e.g., word processing software or drawing software) installed on the client apparatus 110. To cause the display unit 307 to display the screen illustrated in FIG. 4, the control unit 301 reads a FAX driver program from the ROM 303 and executes the FAX driver program loaded into the RAM 302.

The FAX driver screen displayed on the display unit 307 includes a plurality of setting accepting items.

The control unit 301 receives a setting value of each item via the operation unit 304 and stores the received setting value in the HDD 305.

A preview of a transmission target image data generated by application software installed on the client apparatus 110 is displayed in a preview display window 500.

A FAX selection designation item 510 is an item that enables a user to select a target facsimile apparatus (i.e., a transfer source of image data). If a transmission key 630 is pressed in a state where the facsimile apparatus 100 illustrated in FIG. 1 is selected as the image data transfer source, the client apparatus 110 transmits the image data to the facsimile apparatus 100. The facsimile apparatus 100 transmits the received image data to a designated device.

A number-of-copies input item 520 is an item that enables a user to determine the number of copies of the image data to be transmitted. The client apparatus 110 generates image data by an amount corresponding to the number of copies designated by the number-of-copies input item 520 and transmits the generated image data as a FAX job to the facsimile apparatus 100.

A page designation item 530 can be selected when a user wants to transmit all pages of a transmission target image data held by the client apparatus 110. A page designation item 540 can be selected when a user wants to designate a "start" page to an "end" page to transmit a specific part of the image data held by the client apparatus 110.

A paper size designation item 550 is an item that enables a user to determine a desired paper size for the transmission target image data held by the client apparatus 110.

A setting screen selection item 560 is an item that enables a user to select another FAX driver screen. The FAX driver screen illustrated in FIG. 4 relates to basic settings. The user can select special processing (i.e., one of options selectable as the setting screen selection item 560) to perform settings relating to image data resolution and outside line connection number. If the user selects the special processing, a screen illustrated in FIG. 7 is displayed on the display unit 307.

A destination list 570 displays a list of destinations added by a user. If a user presses a destination addition key 580, the control unit 301 causes the display unit 307 to display a destination addition screen illustrated in FIG. 5. Each destination added via the destination addition screen can be included as a part of the destination list 570.

An address book key 590 is a key that enables a user to call preliminarily registered destination information from an address book and add the called destination information to the destination list 570.

A destination editing key 600 is a key that enables a user to edit destination information after the destination information is once added to the destination list 570.

A deletion key 610 is a key that enables a user to delete destination information after the destination information is once added to the destination list 570.

A cancel key 620 is a key that enables a user to stop displaying the screen illustrated in FIG. 4 without validating the setting contents of the screen illustrated in FIG. 4.

The transmission key 630 is a key that enables a user to transmit image data to the facsimile apparatus 100 according to the setting contents of the screen illustrated in FIG. 4.

Next, the destination addition screen, which is displayed when the destination addition key 580 is pressed, will be described in detail below with reference to FIG. 5.

A destination name 810 is an item that enables a user to input an identification name of a destination.

A communication mode 820 is an item that enables a user to select a communication mode when the facsimile apparatus 100 communicates with the destination having an identification name having been input in the destination name 810.

In the present exemplary embodiment, the communication mode that can be selected by the user is any one of G3/G4, Intranet, NGN, and Voice over Internet Protocol (VoIP) Gateway. "NGN" is a next-generation Internet Protocol (IP) network that integrates an internet service IP network with a telephone service telephone network using an IP technique as an IP communication network that is excellent in Quality of Service (QoS) and security. Further, "VoIP" is a technique capable of transmitting a packet including encoded and compressed sound data in real time via an IP network.

A FAX NUMBER/URI 830 is an item that enables a user to determine whether to use FAX number or Uniform Resource Identifier (URI) to communicate with the destination.

Further, a FAX number 840 is an item that enables a user to input a FAX number of the destination. If a URI is selected in the FAX NUMBER/URI 830, a content having been input in the FAX number 840 functions as URI information.

A cancel key 850 is a key that enables a user to cancel the content having been set on the screen illustrated in FIG. 5 and close the screen illustrated in FIG. 5.

An OK key 860 is a key that enables a user to validate the content having been set on the screen illustrated in FIG. 5 and close the screen illustrated in FIG. 5. When the screen illustrated in FIG. 5 is closed, the screen illustrated in FIG. 4 is displayed. When the OK key 860 is pressed, the control unit 301 stores the setting contents of FIG. 5 in the HDD 305 so that the setting contents can be referred to in an image data transmission operation. FIG. 9A illustrates an example of destination information stored in the HDD 305.

Destination information 1 is constituted by destination name "A", destination number "0312345678", communication mode "G3/G4", and FAX NUMBER/URI destination number "FAX number".

Destination information 2 is constituted by destination name "B", destination number "5350", communication mode "Intranet", and FAX NUMBER/URI destination number "FAX number".

Destination information 3 is constituted by destination name "C", destination number "11112222", communication mode "VoIP Gateway", and FAX NUMBER/URI destination number "FAX number".

Destination information 4 is constituted by destination name "D", destination number "abc@xyz.co.jp", communication mode "Intranet", and FAX NUMBER/URI destination number "URI".

FIG. 6 illustrates a screen that is displayed after the above-mentioned four pieces of destination information have been added. The destination list of the screen illustrated in FIG. 6 includes the newly added four pieces of destination information. The total number of the added destination information is not limited to the above-mentioned example and can be only one.

More specifically, destination information 910 is constituted by the destination name "A", the destination number "0312345678", and the communication mode "G3/G4", as displayed in the destination list.

Destination information 920 is constituted by the destination name "B", the destination number "5350", and the communication mode "Intranet", as displayed in the destination list.

Destination information 930 is constituted by the destination name "C", the destination number "11112222", and the communication mode "VoIP Gateway", as displayed in the destination list.

Destination information 940 is constituted by the destination name "D", the destination number "abc@xyz.co.jp", and the communication mode "Intranet", as displayed in the destination list.

If any one of the four pieces of destination information is selected on the screen illustrated in FIG. 6 by an operation using the operation unit 304 and a destination editing key 940 is pressed, the screen illustrated in FIG. 5 is displayed again on the display unit 307 so that the user can edit the selected destination information.

Further, if any one of the four pieces of destination information is selected on the screen illustrated in FIG. 6 by an operation using the operation unit 304 and a deletion key 950 is pressed, the selected destination information can be deleted.

If a transmission key 960 is pressed in a state where four pieces of destination information have been set as mentioned above, the control unit 301 generates a FAX job to transmit image data to a target destination designated by each destination information according to a communication mode indicated by each destination information. The control unit 301 transmits the generated FAX job to the facsimile apparatus 100. The facsimile apparatus 100 executes the FAX job. If the execution of the FAX job is completed, image data can be transmitted to a designated destination (i.e., one of four destinations having been set) according to the communication mode designated by each destination information.

FIG. 7 illustrates a screen that is displayed on the display unit 307 when the option selected in the setting screen selection item 560 is the special processing.

A resolution selection item 1020 is an item that enables a user to designate a resolution of a transmission target image data. The control unit 301 converts the transmission target image data according to the resolution having been set in the resolution selection item 1020 and transmits the converted image data. Alternatively, the control unit 201 of the facsimile apparatus 100 may be configured to perform the above-mentioned image data conversion.

An outside line connection number check field 1010 is a check field that enables a user to designate an outside line connection number, which is determined beforehand for each communication mode, to be added to the FAX number designated as the destination information on the screen illustrated in FIG. 6. If a checkmark is put in the above-mentioned outside line connection number check field 1010, the control unit 301 stores the outside line connection number allocation setting in the RAM 302. Further, if there is an outside line connection number allocation setting having been stored beforehand, the control unit 301 allocates the outside line connection number determined beforehand for each communication mode to the FAX number designated as the destination information on the screen illustrated in FIG. 6.

A setting key 1030 is displayed in a selectable state when a checkmark is put in the outside line connection number check field 1010. If the setting key 1030 is pressed, a screen illustrated in FIG. 8 is displayed on the display unit 307.

The screen illustrated in FIG. 8 is a screen that enables a user to set an outside line connection number for each communication mode.

An item 1110 enables a user to set an outside line connection number to be added to a telephone number of destination information in which the communication mode "G3/G4" is set.

An item 1120 enables a user to set an outside line connection number to be added to a telephone number of destination information in which the communication mode "Intranet" is set.

An item 1130 enables a user to set an outside line connection number to be added to a telephone number of destination information in which the communication mode "NGN" is set.

An item 1140 enables a user to set an outside line connection number to be added to a telephone number of destination information in which the communication mode "VoIP Gateway" is set.

A cancel key 1160 is a key that enables a user to cancel the content having been set on the screen illustrated in FIG. 8 and close the screen illustrated in FIG. 8.

An OK key 1170 is a key that enables a user to validate the content having been set on the screen illustrated in FIG. 8 and close the screen illustrated in FIG. 8. If the OK key 1170 is pressed, the control unit 301 stores the setting contents of FIG. 8 in the HDD 305. If the screen illustrated in FIG. 8 is closed, the screen illustrated in FIG. 7 is displayed again.

FIG. 9B is a table storing outside line connection numbers dedicated to respective communication modes.

The outside line connection number being set for the G3/G4 mode is 0.

The outside line connection number being set for the Intranet mode is 602.

The outside line connection number being set for the NGN mode is 00.

The outside line connection number being set for the VoIP Gateway mode is 050.

However, the outside line connection number field can be a blank space. If the outside line connection number field is blank, no outside line connection number is added to the destination information of the communication mode whose outside line connection number field is blank, even when a checkmark is put in the outside line connection number check field 1010.

Figure 10:
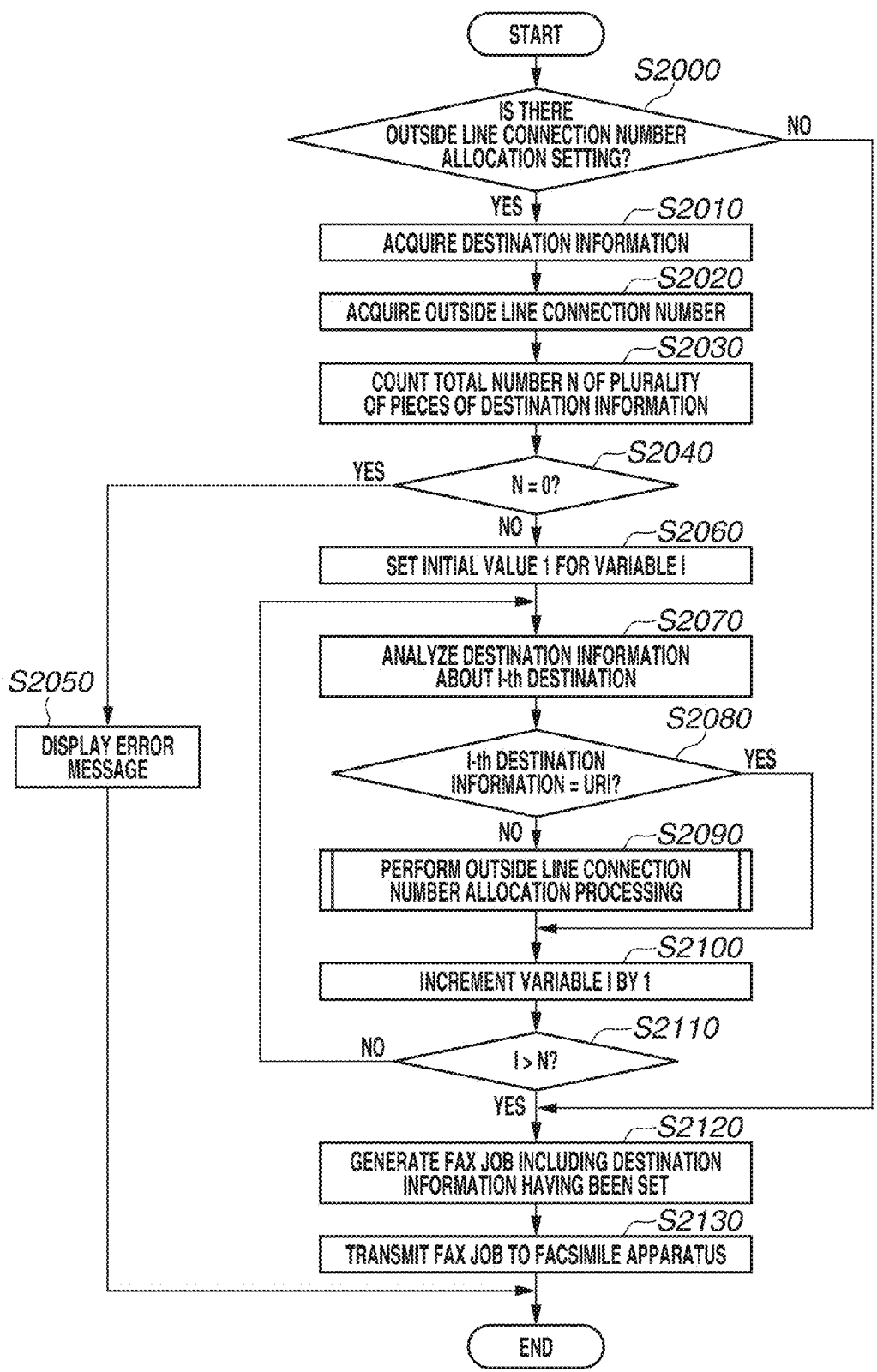
FIG. 10 is a flowchart illustrating control processing that can be performed by the client apparatus according to the first exemplary embodiment.

Next, a control for allocating an outside line connection number to a destination number of destination information added by a user according to a communication mode of the destination information will be described in detail below with reference to a flowchart illustrated in FIG. 10. The processing illustrated in FIG. 10 is started when the transmission key 960 illustrated in FIG. 6 is pressed. The processing illustrated in FIG. 10 is realized by the control unit 301 of the client apparatus 110 reading a program from the ROM 303 and executing the program in a state where the program is loaded in the RAM 302.

In step S2000, the control unit 301 determines whether there is an outside line connection number allocation setting.

If a checkmark is put in the outside line connection number check field 1010 illustrated in FIG. 7, the outside line connection number allocation setting is stored in the RAM 302. In a case where a setting to allocate an outside line connection number is stored in the RAM 302, the control unit 301 determines that there is the outside line connection number allocation setting (YES in step S2000). On the other hand, if no checkmark is put in the outside line connection number check field 1010 illustrated in FIG. 7, no outside line connection number allocation setting is stored in the RAM 302. In this case, the control unit 301 determines that there is not any outside line connection number allocation setting (NO in step S2000).

In step S2010, the control unit 301 acquires the destination information illustrated in FIG. 9A from the HDD 305. If the table illustrated in FIG. 9A includes a plurality of pieces of destination information, the control unit 301 acquires each of the plurality of pieces of destination information.

In step S2020, the control unit 301 acquires the outside line connection numbers illustrated in FIG. 9B from the HDD 305. In the present exemplary embodiment, a unique outside line connection number being set beforehand for each of the plurality of communication modes is stored. Therefore, in step S2020, the control unit 301 acquires a plurality of outside line connection numbers.

In step S2030, the control unit 301 prepares a variable N in the RAM 302 and counts the total number of the plurality of pieces of destination information acquired in step S2010. The control unit 301 stores the counted total number as the variable N.

In step S2040, the control unit 301 determines whether the variable N is 0. If the control unit 301 determines that the variable N is 0 (Yes in step S2040), the operation proceeds step S2050. On the other hand, if the control unit 301 determines that the variable N is not 0 (NO in step S2040), the operation proceeds to step S2060. In step S2050, the control unit 301 causes the display unit 307 to display an error message "destination information is not yet added to the destination list".

In step S2060, the control unit 301 prepares a variable I in the RAM 302 and sets an initial value 1 for the variable I.

In step S2070, the control unit 301 analyzes destination information about an I-th destination.

In step S2080, the control unit 301 determines whether the I-th destination information is URI. If the control unit 301 determines that the I-th destination information is not URI (No in step S2080), the operation proceeds to step S2090. If it is determined that the I-th destination information is URI (Yes in step S2080), the control unit 301 skips the processing in step S2090. Then, the operation proceeds to step S2100.

In step S2090, the control unit 301 performs outside line connection number allocation processing. The outside line connection number allocation processing will be described in detail below with reference to FIG. 11.

Figure 11:
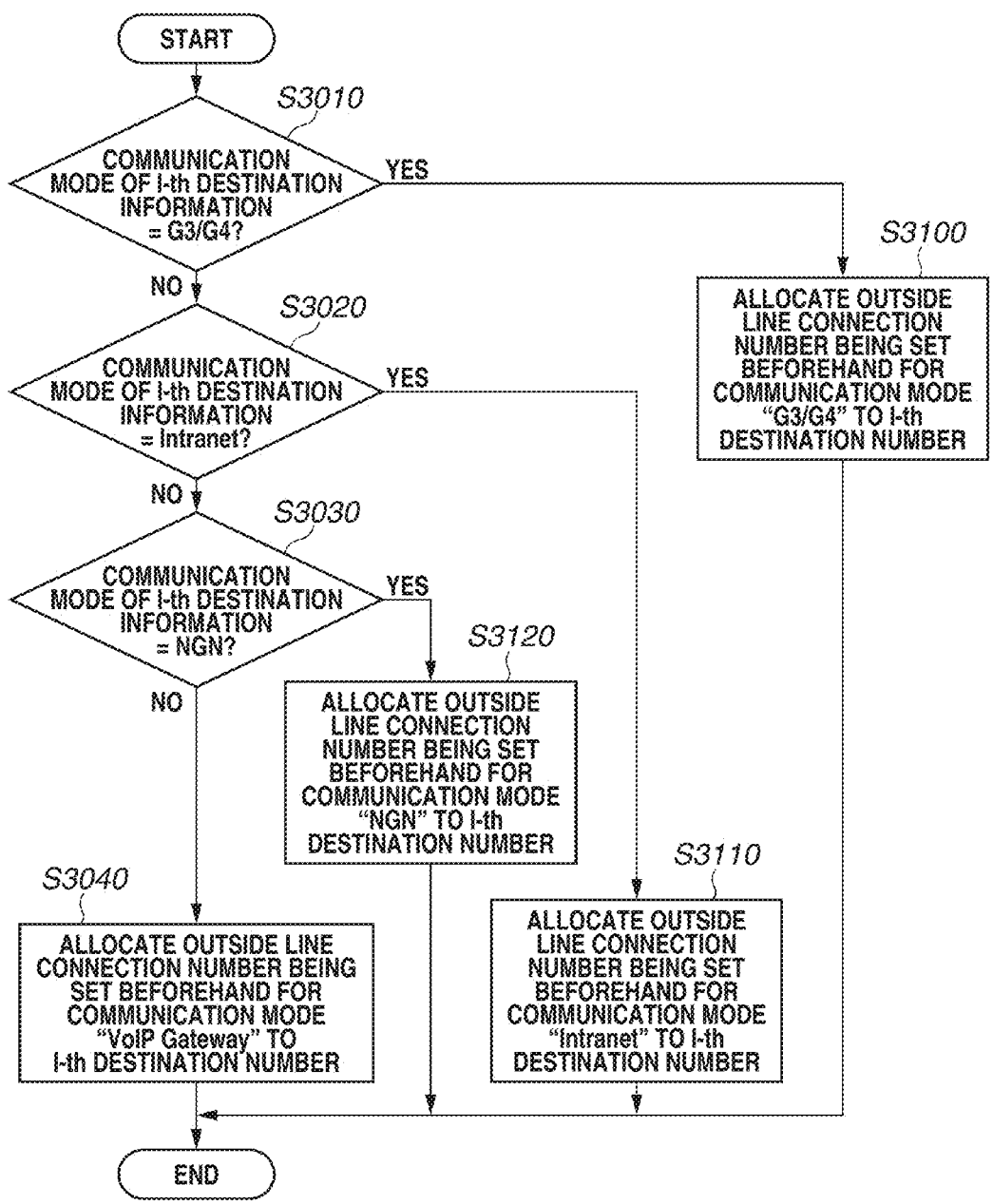
FIG. 11 is a flowchart illustrating control processing that can be performed by the client apparatus according to the first exemplary embodiment.

The processing illustrated in FIG. 11 is realized by the control unit 301 reading a program from the ROM 303 and executing the program in a state where the program is loaded in the RAM 302.

In step S3010, the control unit 301 determines whether the communication mode of the I-th destination information is G3/G4. If it is determined that the communication mode of the I-th destination information is G3/G4 (Yes in step S3010), the operation proceeds to step S3100. If it is determined that the communication mode of the I-th destination information is not G3/G4 (No in step S3010), the operation proceeds to step S3020. In step S3100, the control unit 301 allocates the outside line connection number being set for the communication mode "G3/G4" in the table illustrated in FIG. 9B to the I-th destination number. Then, the operation proceeds to step S2100 illustrated in FIG. 10.

In step S3020, the control unit 301 determines whether the communication mode of the I-th destination information is Intranet. If it is determined that the communication mode of the I-th destination information is Intranet (Yes in step S3020), the operation proceeds to step S3110. If it is determined that the communication mode of the I-th destination information is not Intranet (No in step S3020), the operation proceeds to step S3030. In step S3110, the control unit 301 allocates the outside line connection number being set for the communication mode "Intranet" in the table illustrated in FIG. 9B to the I-th destination number. Then, the operation proceeds to step S2100 illustrated in FIG. 10.

In step S3030, the control unit 301 determines whether the communication mode of the I-th destination information is NGN. If it is determined that the communication mode of the I-th destination information is NGN (Yes in step S3030), the operation proceeds to step S3120. If it is determined that the communication mode of the I-th destination information is not NGN (No in step S3030), the operation proceeds to step S3040. In step S3120, the control unit 301 allocates the outside line connection number being set for the communication mode "NGN" in the table illustrated in FIG. 9B to the I-th destination number. Then, the operation proceeds to step S2100 illustrated in FIG. 10.

In step S3040, the control unit 301 allocates the outside line connection number being set for the communication mode "VoIP Gateway" in the table illustrated in FIG. 9B to the I-th destination number. Then, the operation proceeds to step S2100 illustrated in FIG. 10.

Referring back to the flowchart illustrated in FIG. 10, in step S2100, the control unit 301 increments the variable I by 1. Then, in step S2110, the control unit 301 determines whether the variable I is greater than the total number N of the plurality of pieces of destination information. If the control unit 301 determines that the variable I is not greater than the total number N (No in step S2110), the operation returns to step S2070. The control unit 301 restarts the above-mentioned sequential processing in steps S2070 to S2100 for the next destination information. On the other hand, if the control unit 301 determines that the variable I is greater than the total number N (Yes in step S2110), the operation proceeds to step S2120.

In step S2120, the control unit 301 generates a FAX job that includes transmission target image data held by the client apparatus 110 in addition to transmission settings (including destination information and transmission source information).

In step S2130, the control unit 301 transmits the generated FAX job to the facsimile apparatus 100.

Figure 12:
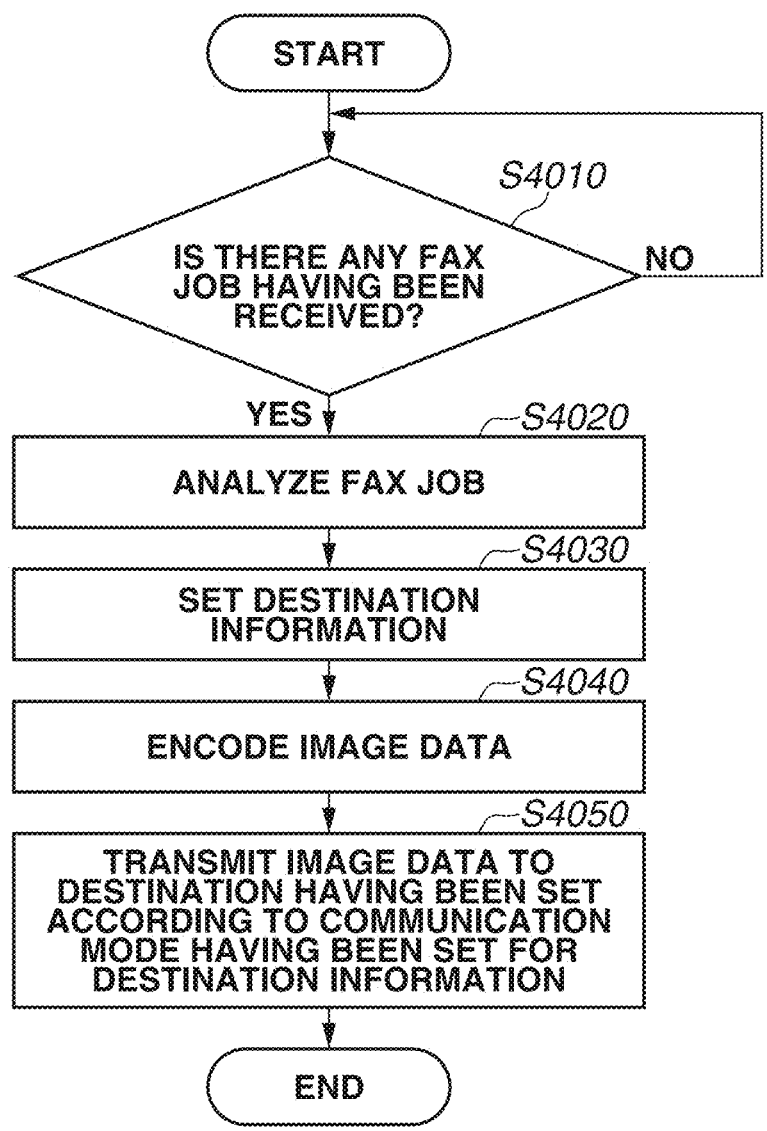
FIG. 12 is a flowchart illustrating control processing that can be performed by the facsimile apparatus according to the first exemplary embodiment.

FIG. 12 illustrates FAX job transmission processing performed by the facsimile apparatus 100. The processing illustrated in FIG. 12 is realized by the control unit 201 reading a program from the ROM 203 and executing the program in a state where the program is loaded in the RAM 202.

In step S4010, the control unit 201 determines whether there is any FAX job having been received from the client apparatus 110. The control unit 201 repeats the processing in step S4010 until at least one FAX job is received. If the control unit 201 determines that there is a FAX job having been received (Yes is step S4010), the operation proceeds to step S4020.

In step S4020, the control unit 201 analyzes the received FAX job to identify each of the destination information, the transmission source information, and the transmission target image data.

In step S4030, the control unit 201 sets a destination of the transmission target image data with reference to the destination information identified in step S4020.

In step S4040, the control unit 201 encodes the transmission target image data.

In step S4050, the control unit 201 transmits the image data to the destination having been set in step S4030 according to a communication mode (i.e., a part of the destination information) having been set by a user.

Performing the above-mentioned control brings an effect of facilitating the allocation of an outside line connection number suitable for each communication mode designated by a user for destination information in a state where a unique outside line connection number is determined beforehand for each communication mode.

Therefore, it is unnecessary for a user to carefully input an outside line connection number that is suitable for each communication mode. The user can allocate an outside line connection number to destination information having been set beforehand with an easy operation of putting a checkmark in the outside line connection number check field 1010.

In particular, when a user transmits image data to a plurality of destinations, the user can collectively allocate an outside line connection number suitable for the communication mode for each destination number with an easy operation of putting a checkmark in the outside line connection number check field 1010.

As mentioned above, the communication mode in the above-mentioned exemplary embodiment is any one of G3/G4, Intranet, NGN, and VoIP Gateway. However, the communication mode is not limited to the above-mentioned example and may be any other type.

As described in the present exemplary embodiment, the FAX driver of the client apparatus 110 performs the above-mentioned processing. However, the facsimile apparatus 100 may be configured to perform similar processing. In this case, the control unit 201 of the facsimile apparatus 100 causes the operation unit 204 to display setting screens that are similar to the screens illustrated in FIGS. 4 to 8 and accept various settings from a user. Then, the control unit 201 performs the processing illustrated in FIGS. 10 to 12. In this case, the destination information illustrated in FIGS. 9A to 9C is stored in the HDD 207.

In the first exemplary embodiment, an outside line connection number is determined beforehand for each of a plurality of communication modes.

In the IP-FAX environment, an IP-FAX outside line connection number may be unnecessary if a user does not allocate any outside line connection number. Therefore, in a second exemplary embodiment, an outside line connection number determined beforehand is added to only a destination other than IP-FAX, as described in detail below.

System and apparatus configurations according to the second exemplary embodiment are similar to those described in the first exemplary embodiment. Therefore, redundant description thereof will be avoided. Characteristic features not described in the first exemplary embodiment will be mainly described in detail below.

According to the disclosure in the first exemplary embodiment, an outside line connection number is set for each communication mode via the screen illustrated in FIG. 8. However, in the present exemplary embodiment, the screen illustrated in FIG. 8 is not used. Instead, a screen illustrated in FIG. 13 is displayed on the display unit 307.

The screen illustrated in FIG. 13 is a screen that is displayed when the setting key 1030 illustrated in FIG. 7 is pressed. The present exemplary embodiment is different from the first exemplary embodiment in that only one outside line connection number input field 1410 is provided.

A user operates the operation unit 304 to input a desired outside line connection number in the outside line connection number input field 1410. Then, if an OK key is pressed, the control unit 301 stores the input outside line connection number 1410 in the RAM 302 and terminates the setting processing.

FIG. 14A illustrates destination information having been added by a user on the screen illustrated in FIG. 6.

FIG. 14B illustrates an outside line connection number having been set by a user on the screen illustrated in FIG. 13.

FIG. 14C illustrates an example of outside line connection numbers, each of which is allocated according to the communication mode of destination information when a user presses the transmission key on the screen illustrated in FIG. 7 in a state where a checkmark is put in the outside line connection number check field 1010.

An outside line connection number 0 is added to only the destination name A (which is not the IP-FAX).

Figure 15:
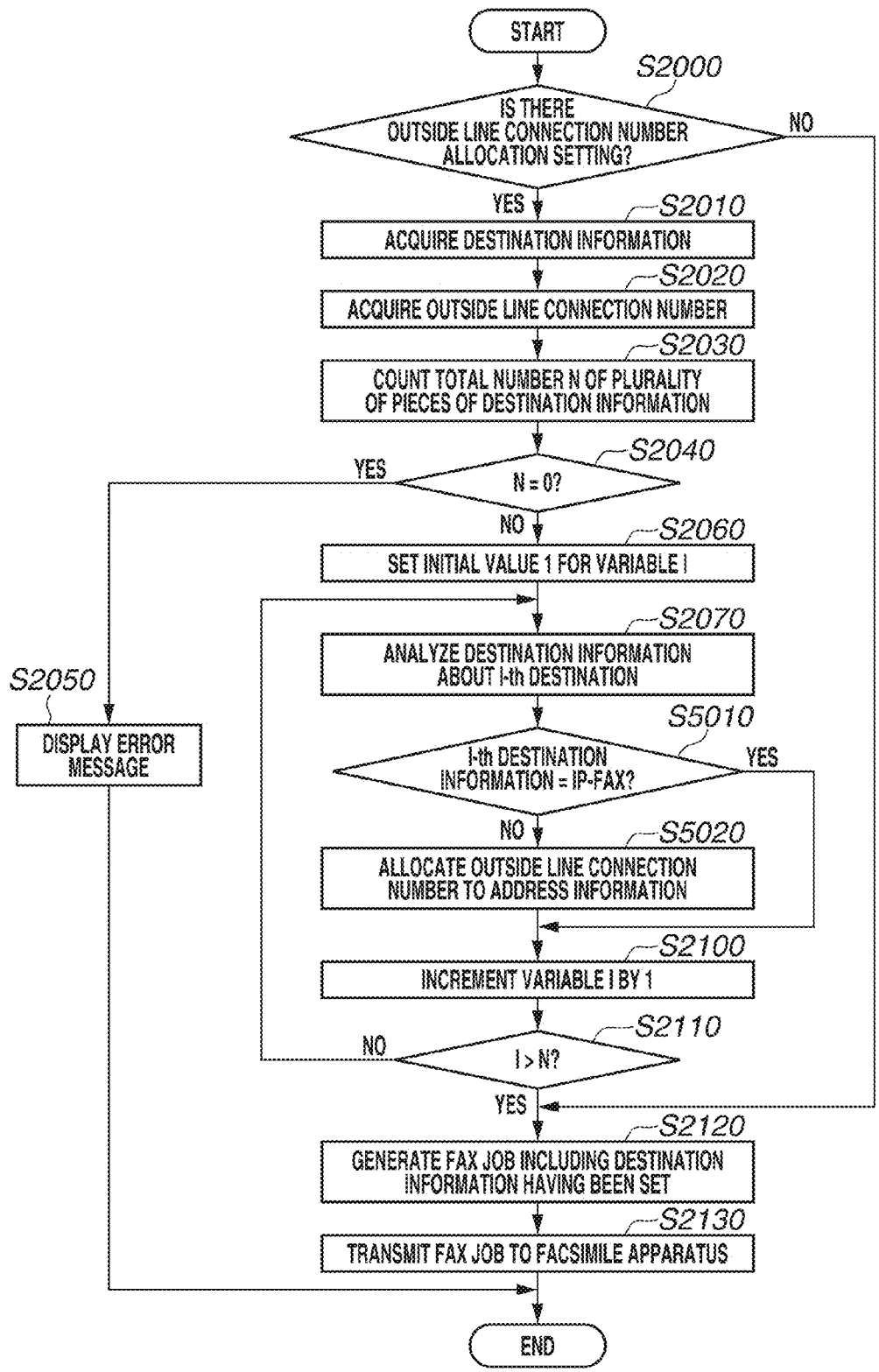
FIG. 15 is a flowchart illustrating control processing that can be performed by the client apparatus according to the second exemplary embodiment.

Next, the outside line connection number allocation processing performed by the client apparatus 110 will be described in detail below with reference to FIG. 15. The processing illustrated in FIG. 15 is realized by the control unit 301 reading a program from the ROM 303 and executing the program in a state where the program is loaded in the RAM 302.

Processing similar to that described in the first exemplary embodiment is denoted by the same reference numeral and redundant description thereof will be avoided.

In step S2070, the control unit 301 acquires destination information about the I-th destination. Subsequently, the operation of the control unit 301 proceeds to step S5010.

In step S5010, the control unit 301 determines whether the I-th destination information is the IP-FAX. If the communication mode of the I-th destination information is any one of Intranet, NGN, and VoIP Gateway, the control unit 301 determines that the I-th destination information is IP-FAX (Yes in step S5010). The operation proceeds to step S2100. On the other hand, if the communication mode of the I-th destination information is G3/G4, the control unit 301 determines that the I-th destination information is not IP-FAX (No in step S5010). The operation proceeds to step S5020. In step S5020, the control unit 301 allocates the outside line connection number illustrated in FIG. 14B, which has been set beforehand by a user, to the head of the I-th destination number. Then, the operation proceeds to step S2100.

Processing to be performed subsequently is similar to the processing described in the first exemplary embodiment.

The above-mentioned control brings an effect of facilitating a user operation for allocating an outside line connection number to destination information of the communication mode other than IP-FAX. In the present exemplary embodiment, destination information to which an outside line connection number is allocated is only one. In a case where there is a plurality of types of destination information having been set about communication modes other than IP-FAX, it is useful to allocate an outside line connection number to the destination information of each communication mode.

In the present exemplary embodiment, the FAX driver of the client apparatus 110 performs the above-mentioned processing. However, the facsimile apparatus 100 may be configured to perform similar processing. In this case, the control unit 201 of the facsimile apparatus 100 causes the operation unit 204 to display setting screens that are similar to the screens illustrated in FIGS. 4 to 8 and accept various settings from a user. Then, the control unit 201 performs the processing illustrated in FIGS. 11, 12, and 15. In this case, the destination information illustrated in FIGS. 9A to 9C is stored in the HDD 207.

In the first exemplary embodiment or the second exemplary embodiment, an outside line connection number having been set beforehand by a user is added to a destination number of destination information, regardless of type or content of the destination number, as described above.

It may be desirable for a user to register a destination number including an outside line connection number as an address in an address book. In this case, the user can read a registered address by operating the address book key 580 and add the read address information to the destination.

In such a case, if an outside line connection number is further added to the destination number, a transmitting operation will not be correctly performed because of duplication of the outside line connection number.

In view of the foregoing issue, a third exemplary embodiment provides a system capable of preventing the duplication in allocating each outside line connection number, if it is determined that an outside line connection number is already added to the head of added destination information, as described in detail below.

System and apparatus configurations according to the third exemplary embodiment are similar to those described in first exemplary embodiment. Therefore, redundant description thereof will be avoided.

FIG. 16A illustrates destination information having been added by a user on the screen illustrated in FIG. 6.

FIG. 16B illustrates outside line connection numbers having been set by a user on the screen illustrated in FIG. 8.

FIG. 16C illustrates an example of outside line connection numbers, each of which is allocated according to the communication mode of destination information when a user presses the transmission key on the screen illustrated in FIG. 7 in a state where a checkmark is put in the outside line connection number check field 1010.

As apparent from the comparison among the destination names A to D, an outside line connection number "050" is newly added to the head of the destination number of the destination name C. However, an outside line connection number "602" is not added to the head of the destination number of the destination name B because the destination information already includes the same outside line connection number.

On the other hand, an outside line connection number "0" of the destination name A and the head "0" of the destination number thereof are duplicated with each other. However, in this case, "0" is exceptionally allocated because the head of the destination number is an area code "03".

Figure 17A:
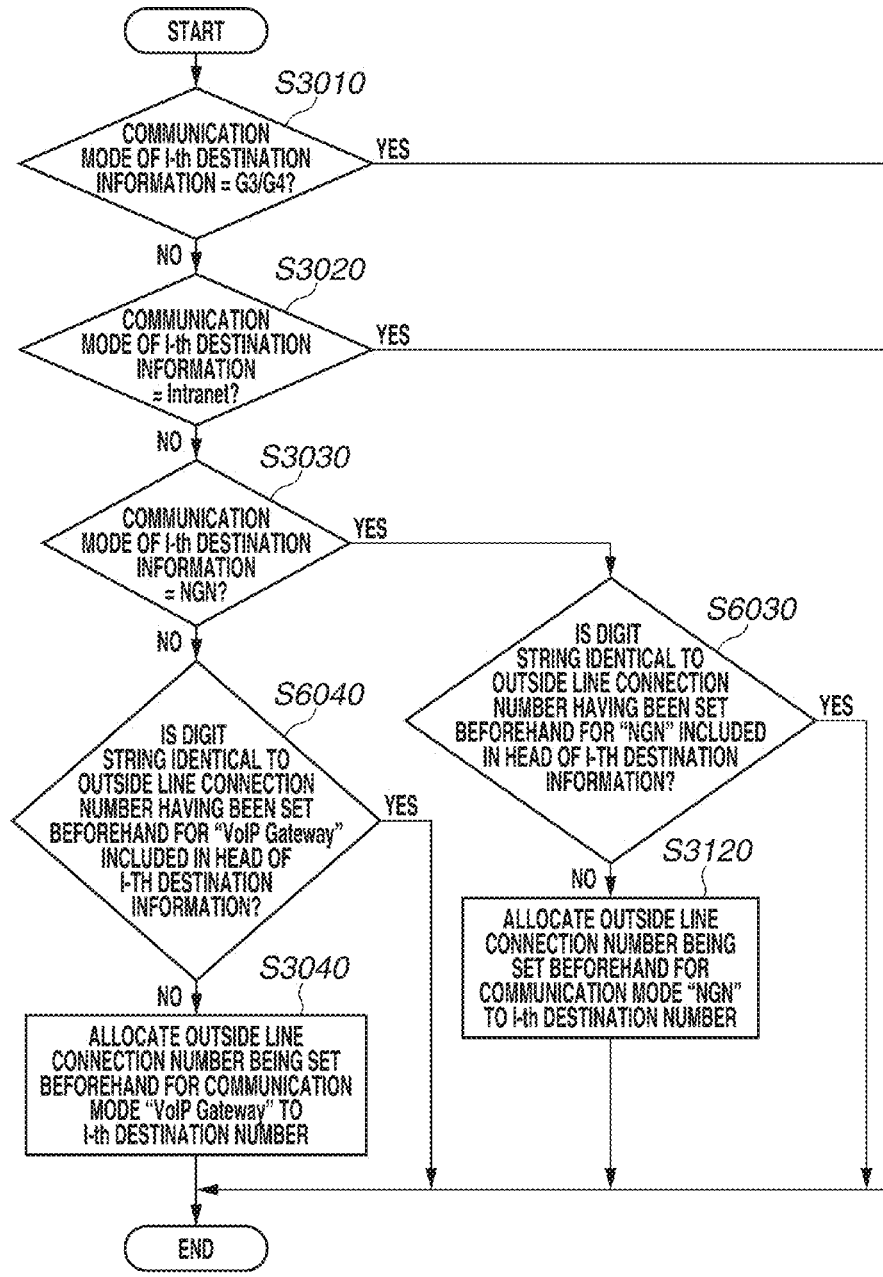
FIG. 17 (17A and 17B) is a flowchart illustrating control processing that can be performed by the client apparatus according to the third exemplary embodiment.
Figure 17B:
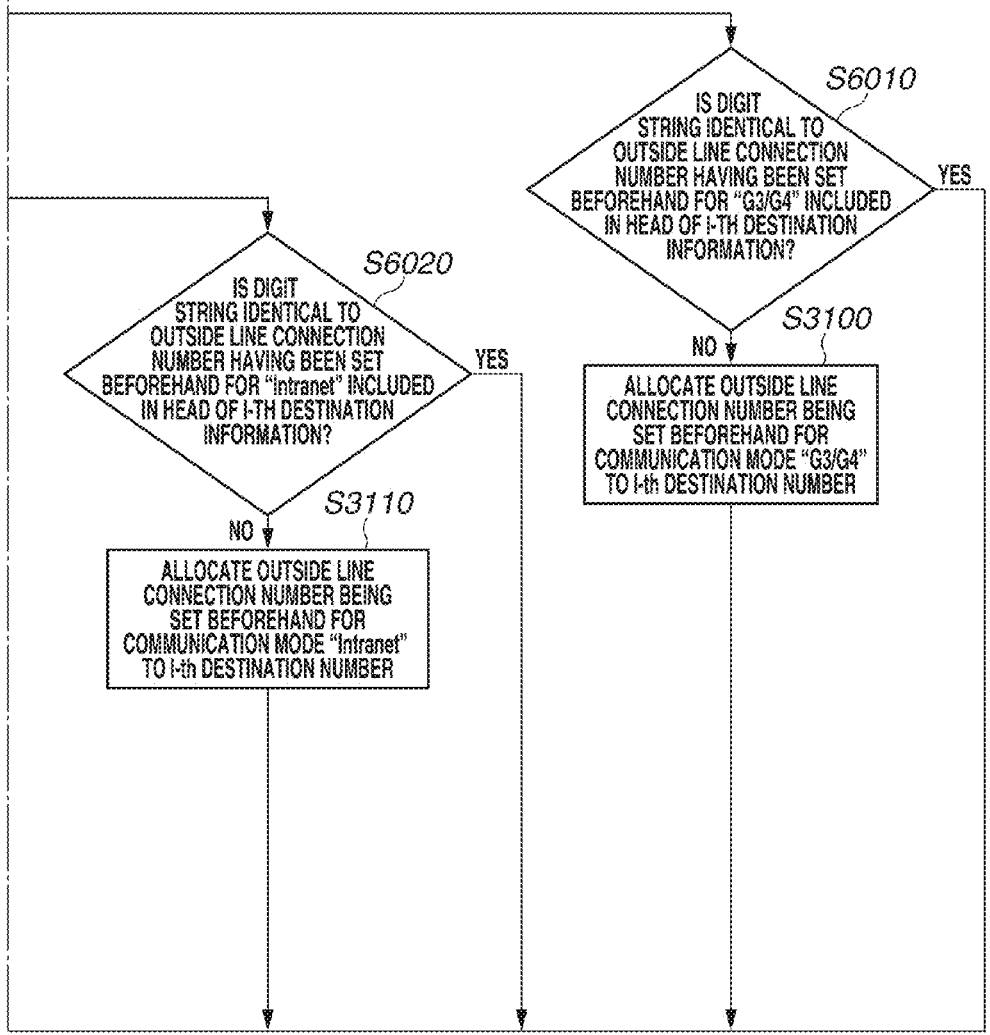

In the present exemplary embodiment, the client apparatus 110 performs processing illustrated in FIG. 17 (i.e., the processing in step S2090 in FIG. 10) instead of performing the outside line connection number allocation processing illustrated in FIG. 11, which has been described in the first exemplary embodiment. In FIG. 17, processing similar to that illustrated in FIG. 11 is denoted by the same reference numeral illustrated in FIG. 11. Redundant description thereof will be avoided. The processing illustrated in FIG. 17 is realized by the control unit 301 reading a program from the ROM 303 and executing the program in a state where the program is loaded in the RAM 302.

In step S3010, the control unit 301 determines whether the communication mode of the I-th destination information is G3/G4. If it is determined that the communication mode of the I-th destination information is G3/G4 (Yes in step S3010), the operation proceeds to step S6010. If it is determined that the communication mode of the I-th destination information is not G3/G4 (No in step S3010), the operation proceeds to step S3020.

In step S6010, the control unit 301 determines whether a digit string identical to the outside line connection number having been set beforehand for the communication mode "G3/G4" is included in the head of the I-th destination information. If it is determined that the digit string identical to the outside line connection number having been set beforehand for the communication mode "G3/G4" is not included in the head of the I-th destination information (No in step S6010), the operation proceeds to step S3100. In step S3100, the control unit 301 allocates the outside line connection number having been set beforehand for the communication mode "G3/G4" (i.e., one of the outside line connection numbers illustrated in FIG. 9B) to the I-th destination number. Subsequently, the operation proceeds to step S2100 illustrated in FIG. 10.

On the other hand, if it is determined that the digit string identical to the outside line connection number having been set beforehand for the communication mode "G3/G4" is included in the head of the I-th destination information (Yes in step S6010), the control unit 301 does not perform the processing in step S3100. The operation proceeds to step S2100 illustrated in FIG. 10.

In step S3020, the control unit 301 determines whether the communication mode of the I-th destination information is Intranet. If it is determined that the communication mode of the I-th destination information is Intranet (Yes in step S3020), the operation proceeds to step S6020. If it is determined that the communication mode of the I-th destination information is not Intranet (No in step S3020), the operation proceeds to step S3030.

In step S6020, the control unit 301 determines whether a digit string identical to the outside line connection number having been set beforehand for the communication mode "Intranet" is included in the head of the I-th destination information. If it is determined that the digit string identical to the outside line connection number having been set beforehand for the communication mode "Intranet" is not included in the head of the I-th destination information (No in step S6020), the operation proceeds to step S3110. In step S3110, the control unit 301 allocates the outside line connection number having been set beforehand for the communication mode "Intranet" (i.e., one of the outside line connection numbers illustrated in FIG. 9B) to the I-th destination number. Subsequently, the operation proceeds to step S2100 illustrated in FIG. 10.

On the other hand, if it is determined that the digit string identical to the outside line connection number having been set beforehand for the communication mode "Intranet" is already included in the head of the I-th destination information (Yes in step S6020), the control unit 301 does not perform the processing in step S3110. The operation proceeds to step S2100 illustrated in FIG. 10.

In step S3030, the control unit 301 determines whether the communication mode of the I-th destination information is NGN. If it is determined that the communication mode of the I-th destination information is NGN (Yes in step S3030), the operation proceeds to step S6030. If it is determined that the communication mode of the I-th destination information is not NGN (No in step S3030), the operation proceeds to step S6040.

In step S6030, the control unit 301 determines whether a digit string identical to the outside line connection number having been set beforehand for the communication mode "NGN" is included in the head of the I-th destination information. If it is determined that the digit string identical to the outside line connection number having been set beforehand for the communication mode "NGN" is not included in the head of the I-th destination information (No in step S6030), the operation proceeds to step S3120.

In step S3120, the control unit 301 allocates the outside line connection number having been set beforehand for the communication mode "NGN" (i.e., one of the outside line connection numbers illustrated in FIG. 9B) to the I-th destination number. Subsequently, the operation proceeds to step S2100 illustrated in FIG. 10. On the other hand, if it is determined that the digit string identical to the outside line connection number having been set beforehand for the communication mode "NGN" is included in the head of the I-th destination information (Yes in step S6030), the control unit 301 does not perform the processing in step S3120. The operation proceeds to step S2100 illustrated in FIG. 10.

On the other hand, if the operation proceeds from step S3030 to step S6040, then in step S6040, the control unit 301 determines whether a digit string identical to the outside line connection number having been set beforehand for the communication mode "VoIP Gateway" is included in the head of the I-th destination information. If it is determined that the digit string identical to the outside line connection number having been set beforehand for the communication mode "VoIP Gateway" is not included in the head of the I-th destination information (No in step S6040), the operation proceeds to step S3040. In step S3040, the control unit 301 allocates the outside line connection number having been set beforehand for the communication mode "VoIP Gateway" (i.e., one of the outside line connection numbers illustrated in FIG. 9B) to the I-th destination number. Subsequently, the operation proceeds to step S2100 illustrated in FIG. 10.

On the other hand, if it is determined that the digit string identical to the outside line connection number having been set beforehand for the communication mode "VoIP Gateway" is included in the head of the I-th destination information (Yes in step S6040), the control unit 301 does not perform the processing in step S3040. The operation proceeds to step S2100 illustrated in FIG. 10.

As described with reference to FIGS. 16A to 16C, in a case where the area code is added to the head of a destination number, the control unit 301 may perform a control to allocate an outside line connection number even when a digit that is identical to the outside line connection number is included in the head of the destination number.

In a case where an outside line connection number is already included in a destination number, the above-mentioned control brings an effect of preventing a transmission error from occurring because of the duplication in allocating an outside line connection number to the destination number.

In the present exemplary embodiment, the FAX driver of the client apparatus 110 can perform the above-mentioned processing. However, the facsimile apparatus 100 may be configured to perform the above-mentioned processing. In this case, the control unit 201 of the facsimile apparatus 100 causes the operation unit 204 to display setting screens that are similar to the screens illustrated in FIGS. 4 to 8 and accept various settings from a user. Then, the control unit 201 performs the processing illustrated in FIGS. 10, 12, and 19. In this case, the destination information illustrated in FIGS. 16A to 16C is stored in the HDD 207.

In the first to third exemplary embodiments, the FAX driver has a function of allocating an outside line connection number having been set by a user, as described above.

In a case where the facsimile apparatus 100 has a function similar to the above-mentioned outside line connection number allocation, a transmission error may occur if an outside line connection number allocated by the FAX driver and an outside line connection number allocated by the facsimile apparatus 100 are duplicated with each other.

In view of the foregoing issue, a fourth exemplary embodiment provides a system capable of preventing the outside line connection number allocated by the FAX driver and the outside line connection number allocated by the facsimile apparatus 100 from being duplicated with each other, in a case where the facsimile apparatus 100 has the above-mentioned outside line connection number allocating function, as described in detail below.

FIG. 18A illustrates destination information having been added by a user on the screen illustrated in FIG. 6.

FIG. 18B illustrates outside line connection numbers having been set by a user on the screen illustrated in FIG. 8.

FIG. 18C illustrates an allocation table including outside line connection numbers, each of which is set by a user in such a way as to be automatically allocated to corresponding destination information by the facsimile apparatus 100. More specifically, according to the settings illustrated in FIG. 18C, "0" is added to the head of a destination number of destination information whose communication mode is G3/G4 and "050" is added to the head of a destination number of destination information whose communication mode is VoIP Gateway.

FIG. 18D illustrates an example of outside line connection numbers, each of which is allocated by the control unit 301 of the client apparatus 110 according to a communication mode of destination information when a user presses the transmission key on the screen illustrated in FIG. 7 in a state where a checkmark is put in the outside line connection number check field 1010.

As apparent from the comparison among the destination names A to D, the outside line connection number "602" is added to the destination name B. On the other hand, the communication mode of the destination name A is G3/G4 and the facsimile apparatus 100 is configured to allocate an outside line connection number. Therefore, the client apparatus 110 does not allocate the outside line connection number "0" to the destination name A. Further, the communication mode of the destination name C is VoIP Gateway and the facsimile apparatus 100 is configured to allocate an outside line connection number. Therefore, the client apparatus 110 does not allocate the outside line connection number "050" to the destination name C.

In the present exemplary embodiment, the client apparatus 110 performs processing illustrated in FIG. 19 (19A and 19B) (i.e., the processing in step S2090 illustrated in FIG. 10) instead of performing the outside line connection number allocation processing illustrated in FIG. 11, which has been described in the first exemplary embodiment. In FIG. 19, processing similar to that illustrated in FIG. 11 is denoted by the same reference numeral illustrated in FIG. 11. Redundant description thereof will be avoided. The processing illustrated in FIG. 19 is realized by the control unit 301 reading a program from the ROM 303 and executing the program in a state where the program is loaded in the RAM 302.

In step S8000, the control unit 301 acquires an outside line connection number allocation table from the facsimile apparatus having been selected in the item 510 illustrated in FIG. 4.

In step S3010, the control unit 301 determines whether the communication mode of the I-th destination information is G3/G4. If it is determined that the communication mode of the I-th destination information is G3/G4 (Yes in step S3010), the operation proceeds to step S8010. If it is determined that the communication mode of the I-th destination information is not G3/G4 (No in step S3010), the operation proceeds to step S3020.

In step S8010, the control unit 301 determines whether the outside line connection number allocation setting for the communication mode "G3/G4" is already completed by the facsimile apparatus. If it is determined that the outside line connection number allocation setting for the communication mode "G3/G4" is not yet completed by the facsimile apparatus (No in step S8010), the operation proceeds to step S3100. In step S3100, the control unit 301 allocates the outside line connection number having been set beforehand for the communication mode "G3/G4" (i.e., one of the outside line connection numbers illustrated in FIG. 9B) to the I-th destination number. Subsequently, the operation proceeds to step S2100 illustrated in FIG. 10.

On the other hand, if it is determined that the outside line connection number allocation setting for the communication mode "G3/G4" is already completed by the facsimile apparatus (Yes in step S8010), the control unit 301 does not perform the processing in step S3100. The operation proceeds to step S2100 illustrated in FIG. 10.

In step S3020, the control unit 301 determines whether the communication mode of the I-th destination information is Intranet. If it is determined that the communication mode of the I-th destination information is Intranet (Yes in step S3020), the operation proceeds to step S8020. If it is determined that the communication mode of the I-th destination information is not Intranet (No in step S3020), the operation proceeds to step S3030.

In step S8020, the control unit 301 determines whether the outside line connection number allocation setting for the communication mode "Intranet" is already completed by the facsimile apparatus. If it is determined that the outside line connection number allocation setting for the communication mode "Intranet" is not yet completed by the facsimile apparatus (No in step S8020), the operation proceeds to step S3110. In step S3110, the control unit 301 allocates the outside line connection number having been set beforehand for the communication mode "Intranet" (i.e., one of the outside line connection numbers illustrated in FIG. 9B) to the I-th destination number. Subsequently, the operation proceeds to step S2100 illustrated in FIG. 10.

On the other hand, if it is determined that the outside line connection number allocation setting for the communication mode "Intranet" is already completed by the facsimile apparatus (Yes in step S8020), the control unit 301 does not perform the processing in step S3110. The operation proceeds to step S2100 illustrated in FIG. 10.

In step S3030, the control unit 301 determines whether the communication mode of the I-th destination information is NGN. If it is determined that the communication mode of the I-th destination information is NGN (Yes in step S3030), the operation proceeds to step S8030. If it is determined that the communication mode of the I-th destination information is not NGN (No in step S3030), the operation proceeds to step S8040.

In step S8030, the control unit 301 determines whether the outside line connection number allocation setting for the communication mode "NGN" is already completed by the facsimile apparatus. If it is determined that the outside line connection number allocation setting for the communication mode "NGN" is not yet completed by the facsimile apparatus (No in step S8030), the operation proceeds to step S3120.

In step S3120, the control unit 301 allocates the outside line connection number having been set beforehand for the communication mode "NGN" (i.e., one of the outside line connection numbers illustrated in FIG. 9B) to the I-th destination number. Subsequently, the operation proceeds to step S2100 illustrated in FIG. 10. On the other hand, if it is determined that the outside line connection number allocation setting for the communication mode "NGN" is already completed by the facsimile apparatus (Yes in step S8030), the control unit 301 does not perform the processing in step S3120. The operation proceeds to step S2100 illustrated in FIG. 10.

On the other hand, if the operation proceeds from step S3030 to step S8040, then in step S8040, the control unit 301 determines whether the outside line connection number allocation setting for the communication mode "VoIP Gateway" is completed by the facsimile apparatus. If it is determined that the outside line connection number allocation setting for the communication mode "VoIP Gateway" is not yet completed by the facsimile apparatus (No in step S8040), the operation proceeds to step S3040. In step S3040, the control unit 301 allocates the outside line connection number having been set beforehand for the communication mode "VoIP Gateway" (i.e., one of the outside line connection numbers illustrated in FIG. 9B) to the I-th destination number. Subsequently, the operation proceeds to step S2100 illustrated in FIG. 10.

On the other hand, if it is determined that the outside line connection number allocation setting for the communication mode "VoIP Gateway" is already completed by the facsimile apparatus (Yes in step S8040), the control unit 301 does not perform the processing in step S3040. The operation proceeds to step S2100 illustrated in FIG. 10.

In a case where the outside line connection number allocation setting is already completed by the facsimile apparatus, the above-mentioned control brings an effect of preventing a transmission error from occurring because of the duplication in allocating an outside line connection number to a destination number transmitted from the client apparatus to the facsimile apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-079520, filed Apr. 8, 2014, which is hereby incorporated by reference herein in its entirety.

What is claimed is:

1. An information processing apparatus comprising:
a memory; and
a processor in communication with the memory, the processor configured to control:
a storage unit configured to store connection numbers;
a receiving unit configured to receive a destination number from a user;

a determination unit configured to determine a communication mode for performing communications based on the destination number received by the receiving unit; and a control unit configured to control the information processing apparatus in such a way as to use the destination number and a first connection number as a destination in a case where the communication mode determined by the determination unit is a FAX mode, and configured to control the information processing apparatus in such a way as to use the destination number and a second connection number, which is different from the first connection number, as a destination in a case where the communication mode determined by the determination unit is an IP-FAX mode, wherein in a case where a connection number stored in the storage unit is included in a head of the destination number received by the receiving unit, the control unit prevents the information processing apparatus from using the connection number as a destination.

2. The information processing apparatus according to claim 1, wherein the receiving unit is configured to receive a first destination number and a second destination number, which is different from the first destination number, the determination unit is configured to determine a communication mode using the first destination number to perform communications and a communication mode using the second destination number to perform communications, the control unit is configured to control the information processing apparatus in such a way as to use the first destination number and the first connection number as a destination in a case where the communication mode using the first destination number to perform communications is the FAX mode, and is configured to control the information processing apparatus in such a way as to use the first destination number and the second connection number as a destination in a case where the communication mode using the first destination number to perform communications is the IP-FAX mode, and the control unit is further configured to control the information processing apparatus in such a way as to use the second destination number and the first connection number as a destination in a case where the communication mode using the second destination number to perform communications is the FAX mode, and is configured to control the information processing apparatus in such a way as to use the second destination number and the second connection number as a destination in a case where the communication mode using the second destination number to perform communications is the IP-FAX mode.

3. The information processing apparatus according to claim 1, wherein the CPU is further configured to control:

a transmission unit configured to transmit image data to an image processing apparatus, wherein in a case where a connection number is allocated by the image processing apparatus, the control unit is configured to prevent the information processing apparatus from using the connection number as a destination.

4. The information processing apparatus according to claim 3, wherein the transmission unit is configured to further transmit a destination number to which the connection number is allocated, to the image processing apparatus.

5. The information processing apparatus according to claim 1, wherein the control unit is configured to control the information processing apparatus in such a way as to allocate the first connection number to a head of the destination number in a case where the communication mode using the destination number to perform communications is the FAX mode, and is configured to control the information processing apparatus in such a way as to allocate the second connection number, which is different from the first connection number, to the head of the destination number in a case where the communication mode using the destination number to perform communications is the IP-FAX mode.

6. The information processing apparatus according to claim 1, wherein the IP-FAX mode includes any one of Intranet, NGN, and VoIP Gateway.

7. The information processing apparatus according to claim 1, wherein the CPU is further configured to control:

a reading unit configured to read an original document; and a transmission unit configured to transmit image data of the original document read by the reading unit to the destination.

8. A method for controlling an information processing apparatus including a memory and processor in communication with the memory, comprising:

storing connection numbers in the information processing apparatus;

receiving a destination number from a user;

determining a communication mode for each received destination number;

controlling the information processing apparatus in such a way as to use the destination number and a first connection number as a destination in a case where the determined communication mode is a FAX mode, and controlling the information processing apparatus in such a way as to use the destination number and a second connection number as a destination, which is different from the first connection number, in a case where the determined communication mode is an IP-FAX mode, and preventing, in a case where a stored connection number is included in a head of the destination number received, the information processing apparatus from using the connection number as a destination.

9. A non-transitory computer readable storage medium storing a program that causes a computer to execute a control method of an information processing apparatus, the method comprising:

storing connection numbers in the information processing apparatus;

receiving a destination number from a user;

determining a communication mode for each received destination number;

controlling the information processing apparatus in such a way as to use the destination number and a first connection number as a destination in a case where the determined communication mode is a FAX mode, and controlling the information processing apparatus in such a way as to use the destination number and a second connection number as a destination, which is different from the first connection number, in a case where the determined communication mode is an IP-FAX mode, and preventing, in a case where a stored connection number is included in a head of the destination number received, the information processing apparatus from using the connection number as a destination.

* * * * *